United States Patent
Tang et al.

(10) Patent No.: US 9,025,262 B1
(45) Date of Patent: May 5, 2015

(54) SYSTEMS AND METHODS FOR ASYMMETRY DETECTION BASED ON A SYNCHRONIZATION MARK

(71) Applicant: Marvell International Ltd., Hamilton (BM)

(72) Inventors: Heng Tang, San Jose, CA (US); Panu Chaichanavong, Bangkok (TH); Gregory Burd, San Jose, CA (US); Yu-Yao Chang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/307,136

(22) Filed: Jun. 17, 2014

Related U.S. Application Data

(60) Provisional application No. 61/837,774, filed on Jun. 21, 2013.

(51) Int. Cl.
*G11B 5/02* (2006.01)
*G11B 27/36* (2006.01)
*G11B 20/10* (2006.01)

(52) U.S. Cl.
CPC ................ *G11B 20/10009* (2013.01)

(58) Field of Classification Search
CPC .. G11B 2220/20; G11B 15/087; G11B 27/36; G11B 5/012; G11B 20/18
USPC ............ 369/47.1, 53.21, 124.1, 124.2, 47.53; 360/28, 27, 31, 53, 25, 29, 39, 30, 51
See application file for complete search history.

(56) References Cited

U.S. PATENT DOCUMENTS

| | | | | |
|---|---|---|---|---|
| 5,872,763 | A * | 2/1999 | Osakabe | 369/47.53 |
| 7,215,631 | B2 * | 5/2007 | Horibe et al. | 369/124.1 |
| 7,697,385 | B2 * | 4/2010 | Ueki | 369/47.53 |

\* cited by examiner

*Primary Examiner* — Nabil Hindi

(57) ABSTRACT

Systems and methods are provided for evaluating an asymmetry metric. A receiver receives a synchronization signal, a filtered signal, and a reference signal. A processor processes the synchronization signal and the reference signal to obtain a peak indicator signal, identifies a first set of values and a second set of values from the filtered signal based at least in part on the peak indicator signal, and evaluates an asymmetry metric from the first set of values and the second set of values.

18 Claims, 7 Drawing Sheets

SYSTEMS AND METHODS FOR ASYMMETRY DETECTION BASED ON A SYNCHRONIZATION MARK

CROSS REFERENCE TO RELATED APPLICATION

This application claims the benefit under 35 U.S.C. §119(e) of U.S. Provisional Application No. 61/837,774, filed on Jun. 21, 2013, which is hereby incorporated by reference herein in its entirety.

FIELD OF USE

This disclosure relates to methods and systems for evaluating asymmetry of a received signal associated with a read channel of a hard drive.

BACKGROUND OF THE INVENTION

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Signals received from a read head of a hard drive may be asymmetric. It is important in processing signals received from the read head to correct for any asymmetry in the signal to accurately process data from the hard drive. An ideal, symmetric signal received from a read head includes positive peak amplitudes that are, on average, equal in magnitude to negative peak amplitudes, while a non-ideal, asymmetric signal received from a hard drive may include positive peak amplitudes that are not equal in magnitude to negative peak amplitudes. If asymmetry in the signals is not corrected, the asymmetry may cause errors when reading the data from the hard drive.

SUMMARY

In view of the foregoing, systems and methods are provided for evaluating an asymmetry metric.

According to one aspect of the disclosure, a receiver receives a synchronization signal, a filtered signal, and a reference signal. A processor processes the synchronization signal and the reference signal to obtain a peak indicator signal, identifies a first set of values and a second set of values from the filtered signal based at least in part on the peak indicator signal, and evaluates an asymmetry metric from the first set of values and the second set of values.

In some embodiments, the synchronization signal is associated with a hard drive and the asymmetry metric is indicative of a degree of asymmetry in the hard drive. The asymmetry metric may be used to initiate a correction in a read process for the hard drive. In some embodiments, the filtered signal is representative of a finite impulse response of the synchronization signal. The first set of values may correspond to a set of positive peak locations in the filtered signal and the second set of values may correspond to a set of negative peak locations in the filtered signal.

According to one aspect of the disclosure, a system comprises circuitry that evaluates an asymmetry metric. The circuitry is configured to receive a synchronization signal, a filtered signal, and a reference signal, and process the synchronization signal and the reference signal to obtain a peak indicator signal. The circuitry identifies a first set of values and a second set of values from the filtered signal based at least in part on the peak indicator signal, and evaluates an asymmetry metric from the first set of values and the second set of values.

In some embodiments, the synchronization signal is associated with a hard drive and the asymmetry metric is indicative of a degree of asymmetry in the hard drive. The circuitry may be further configured to use the asymmetry metric to initiate a correction in a read process for the hard drive. In some embodiments, the filtered signal is representative of a finite impulse response of the synchronization signal. The first set of values may correspond to a set of positive peak locations in the filtered signal and the second set of values may correspond to a set of negative peak locations in the filtered signal.

BRIEF DESCRIPTION OF THE DRAWINGS

Further features of the disclosure, its nature and various advantages, will be apparent upon consideration of the following detailed description, taken in conjunction with the accompanying drawings, in which.

DETAILED DESCRIPTION

To provide an overall understanding of the disclosure, certain illustrative embodiments will now be described, including systems and methods for evaluating a severity of asymmetry in a read channel of a hard drive. However, the systems and methods described herein may be adapted and modified as is appropriate for the application being addressed and that the systems and methods described herein may be employed in other suitable applications, and that such other additions and modifications will not depart from the scope thereof.

Figure 1:
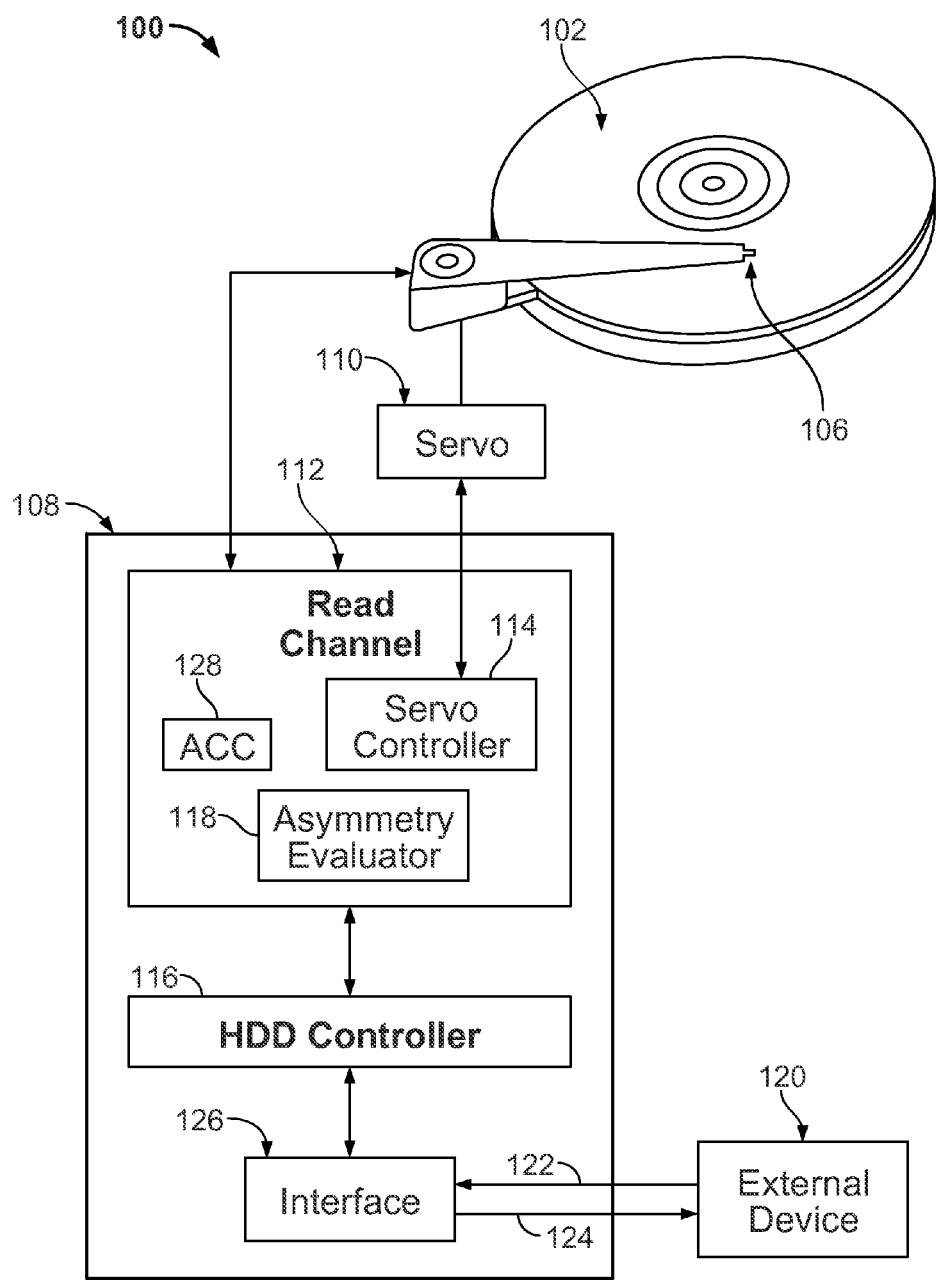
FIG. 1 shows a block diagram of an illustrative hard drive control system in accordance with an embodiment of the present disclosure.

FIG. 1 shows a block diagram of an illustrative hard drive control system 100 in accordance with an embodiment of the present disclosure. Hard drive control system 100 includes hard disk 102 and control interface 108. Control interface 108 receives data from external device 120 via input 122 and provides data to external device 120 via output 124. In an example, external device 120 may correspond to a computer motherboard, an audio device, a cellular phone, or a portable media storage device.

Interface 126 passes commands between external device 120 and hard drive controller (HDC) 116. HDC 116 generates intended control signals describing desired data operations to and from hard disk 102. In particular, the intended control signals may be in the form of instructions, which are generated at the approximate times that the desired data operations are to occur. For example, HDC 116 may issue intended read, write, and servo operations to be performed on hard disk 102.

When data is read from hard disk 102, read head 106 generates a data signal that represents a bit pattern that is stored or etched onto hard disk 102. Asymmetry may be caused by instability in the read head or inherent defects in the magnetic disk of the hard drive, such as variation in the magnetic fields on the disk. Additionally, when bits are read from hard disk 102, the asymmetry may vary within a sector of the hard disk or from sector to sector on the hard disk. The data signal may include asymmetries that result from noise in servo motor 110 or servo controller 114 which causes the read head to follow an incorrect read path. The systems and methods of the present disclosure allow for accurate detection and correction of an amount of asymmetry that is in a data signal.

As stated above, asymmetry in a read channel may cause errors during processing of a signal. One method for correcting asymmetry in a hard drive includes applying a constant correction factor to the received signal to account for the asymmetry. However, the asymmetry that is manifested in a read channel of a hard drive is not necessarily constant throughout the hard drive. In particular, the asymmetry may vary over the lifetime of hard disk 102, or even from sector to sector during a read operation. Methods may attempt to correct for this variation in asymmetry by calculating and applying a correction factor using a correction loop in hard drive read channel 112. However, the correction loop may take hundreds or thousands of bits before converging to a stable correction factor. The systems and methods of the present disclosure allow for a quicker and more efficient way to "jump start" asymmetry correction.

Asymmetry in a signal may be modeled using a non-linear model such as the model shown in Eqn. 1.

$$y = x + qx^2 \quad (1)$$

In Eqn. 1, x represents a signal without asymmetry, y represents a signal with asymmetry, and q is an asymmetry metric, which represents a severity of asymmetry in the signal. When q is equal to zero, the signal y is equal to the symmetric signal x, and no asymmetry exists in the signal y. In this case, the signal y is a symmetric signal which may be centered around zero or some DC value. When q is greater than zero, the asymmetric signal y is generally positively shifted compared to the symmetric signal x. On the other hand, when q is less than zero, the asymmetric signal y is generally negatively shifted compared to the symmetric signal x. While the asymmetry model described by Eqn. 1 is a non-linear asymmetry model that is a function of the square of the symmetric signal x, any other suitable type of a non-linear model may be used to model asymmetry in a hard drive. Moreover, a linear model such as a DC gain model may be used. In general, one purpose of the present disclosure is to provide an estimate of q in real time so that asymmetry correction may be applied as q varies over time.

Asymmetry evaluator 118 is located within read channel (RC) 112 and receives a signal that is generated when data from hard disk 102 is read by read head 106. The received signal may represent any portion of data received from hard disk 102 such as a preamble, a synchronization mark, user data, a data integrity field, an error detection code, an error correction code, padding bits, or any other suitable data that may be stored on a hard drive. As shown in FIG. 1, asymmetry evaluator circuitry 118 is located within RC 112, but in general, one of ordinary skill in the art will understand that asymmetry evaluator circuitry 118 may be located within any other suitable block, such as within HDD controller 116 or on a separate device outside of control interface 108 such as external device 120.

Asymmetry evaluator 118 detects an amount of asymmetry in a response signal that is read from hard disk 102. Upon determining the amount of asymmetry in the signal, asymmetry evaluator 118 provides an asymmetry metric to an asymmetry correction circuit (ACC) 128, which corrects for the detected asymmetry. As shown in FIG. 1, ACC 128 is located within RC 112, but in general, one of ordinary skill in the art will understand that ACC 128 may be located in the same device as asymmetry evaluator 118 or a different device, without departing from the scope of the present disclosure. In general, the asymmetry metric may be any measure of a severity of the asymmetry in a read signal from a hard drive. In particular, when the asymmetry metric is high, this indicates that the signal has a large amount of asymmetry, while an asymmetry metric with a low value indicates that the signal has a small amount of asymmetry. Furthermore, an asymmetry metric that is zero indicates that the signal is symmetric.

In an example, the asymmetry metric is a percentage that represents a ratio of the difference between an average magnitude of positive peak values and an average magnitude of negative peak values over a reference peak value. The reference peak value is a sum of the average magnitude of the positive peak values and the average magnitude of the negative peak values.

After receiving the asymmetry metric, ACC 128 corrects for the detected amount of asymmetry in the signal by applying a correction factor to the signal. In some embodiments, ACC 128 applies a DC gain to the signal to compensate for the asymmetry. In general, ACC 128 may apply different DC gains to different portions of the signal to correct for the asymmetry in the signal. In particular, the asymmetry metric may be assessed and updated continuously, and the correction factor may also be continuously updated and applied to the signal to correct for varying amounts of asymmetry.

In an example, ACC 128 initiates, or "jump starts," the asymmetry correction process by estimating an amount of asymmetry in the received signal based on the asymmetry metric. By quickly estimating an initial value of the asymmetry to jump-start the asymmetry correction process, the systems and methods of the present disclosure enable ACC 128 to efficiently correct for the asymmetry faster than if asymmetry estimation and correction began without such an initialization. Once the asymmetry correction is initiated, ACC 128 may precisely adjust the asymmetry correction as the severity of the asymmetry varies as data is read from hard disk 102.

Figure 2:
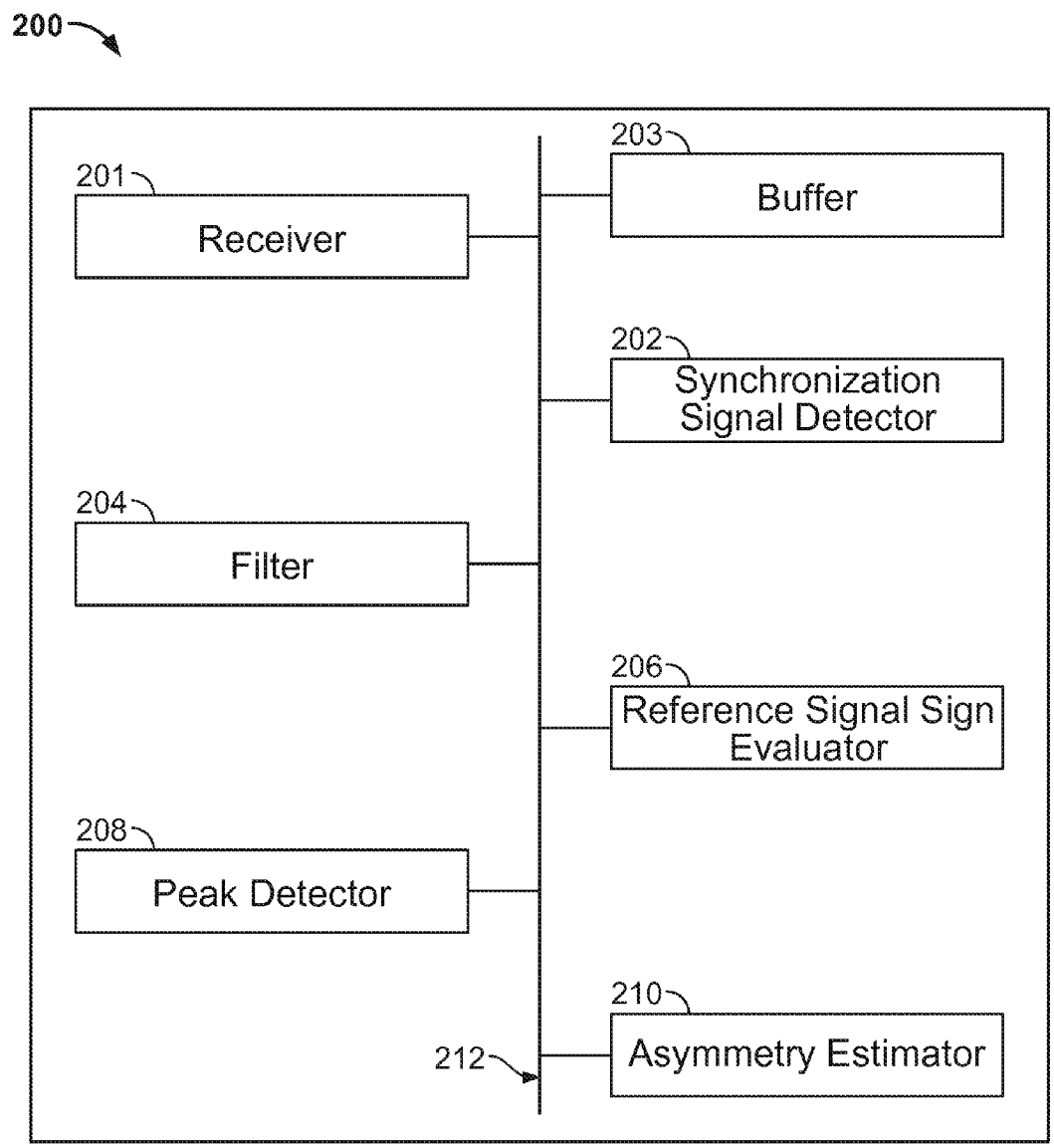
FIG. 2 shows a block diagram of an asymmetry evaluator in accordance with an embodiment of the present disclosure.

FIG. 2 shows a block diagram of an asymmetry evaluator 200, such as asymmetry evaluator 118 shown in FIG. 1, in accordance with an embodiment of the present disclosure. Asymmetry evaluator 200 includes a receiver 201, a synchronization signal detector 202, a buffer 203, a reference signal sign evaluator 206, a peak detector 208, a filter 209, and an asymmetry estimator 210, all connected over a bus 212. Receiver 201 receives a signal from RC 112 as data is read from hard disk 102. The received signal is transmitted to synchronization signal detector 202, which detects a synchronization mark in the signal. A synchronization mark is a known pattern used to identify the start of user data in hard disk 102. For example, the synchronization mark may correspond to a correlation synchronization mark that is a 20-bit user programmable pattern of bits. In another example, the synchronization mark may correspond to a Viterbi synchronization mark that is a 36-bit fixed pattern of bits. In general, the synchronization mark may correspond to any suitable type of synchronization mark in hard disk 102.

After detection, the synchronization mark may be stored in a memory unit, such as buffer 203, for further processing. Filter 204 then applies a filter to the synchronization mark. The filter may be a finite impulse response filter, Kalman filter, a filter based on a Fourier transform, or any other suitable type of filter. In an example, the filter coefficients are determined from a reference signal, or a target signal. The target signal may correspond to a desired response in the discrete time domain when the input waveform is equalized. In an example, if the target is [4 7 1 0 0], the input waveform may be equalized such that an isolated data bit of "1" yields a series of signal samples [4.0 7.0. 1.0 0.0 0.0], and an isolated bit of "0" yields a series of signal samples [−4.0 −7.0 −1.0 0.0 0.0]. Reference signal sign evaluator 206 evaluates the signs of the reference signal and obtains a sign signal that corresponds to the signs of the values in the reference signal.

The filtered signal is transmitted to peak detector 208, which detects peaks in the filtered signal. In an example, peak detector 208 determines the locations of positive and negative peaks in the filtered signal by evaluating the signs of the filter coefficients and using a sliding window to compute bit-wise products between the signs of the filter coefficients and the synchronization mark.

After peak detector 208 detects the positive peaks and negative peaks in the filtered signal, the values associated with the positive peaks and the negative peaks are passed to asymmetry estimator 210. Asymmetry estimator 210 estimates an asymmetry metric q using Eqn. 2.

$$q = \frac{|A| - |B|}{|A| + |B|} \quad (2)$$

In Eqn. 2, q represents an asymmetry metric, A represents an average positive peak value, and B represents an average negative peak value. In an example, the asymmetry metric q in Eqn. 2 corresponds to the same asymmetry metric q in Eqn. 1. In Eqn. 2, q may range from −1 to 1 and is a fractional or percentage value. When q equals zero, the average of the positive peak magnitudes and the average of the negative peak magnitudes in the received signal are the same. Thus, the received signal is substantially symmetric. When q does not equal zero, the received signal is asymmetric. For example, when q equals 1, the average of the negative peak magnitudes of the signal is zero. On the other hand, when q is −1, the average of the positive peak magnitudes of the signal is zero. As described above, the asymmetry metric q is representative of a severity of asymmetry in a signal.

Figure 3:
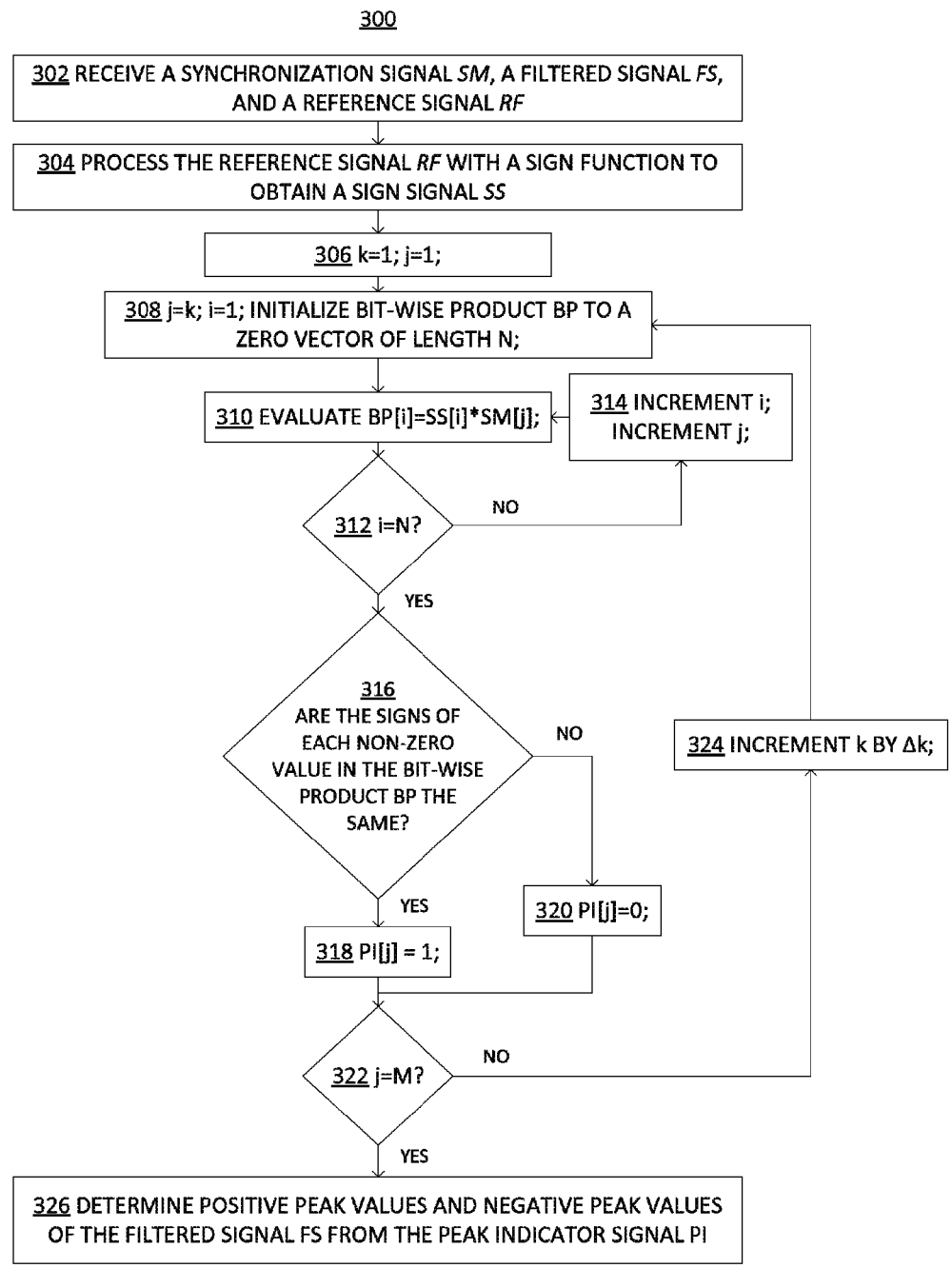
FIG. 3 shows a flow diagram for computing peak positions in a received signal, in accordance with an embodiment of the present disclosure.

FIG. 3 shows a flow diagram of a process 300 for computing peak positions in a received signal, in accordance with an embodiment of the present disclosure. The computed peak positions may be used to estimate an amount of asymmetry in the received signal. At 302, peak detector 208 determines a synchronization signal SM, a filtered signal FS, and a reference signal RS. As used herein, a "signal" may correspond to a set of values, such as integers, that are read from registers programmed by firmware. In an example, the synchronization signal SM and the reference or target signal may remain fixed within the same zone or region of the disk. In this case, the synchronization signal SM and the reference or target signal may be stored internally and used for processing of the entire zone or region of the disk. The synchronization signal SM may be a known signal corresponding to a synchronization mark that leads user data in a hard drive sector. The filtered signal FS is a filtered version of the synchronization signal. The synchronization signal SM may be filtered using any suitable filtering method as discussed above with respect to FIG. 2.

At 304, peak detector 208 applies a sign function to the reference signal RS to obtain a sign signal SS, which includes the sign of each value in the reference signal. For example, a reference signal with values [4 7 1 0 0] corresponds to a sign signal with values [1 1 1 0 0].

At 306, peak detector 208 initializes counter variables k and j to 1. At 308, peak detector 208 initializes counter variable i to 1, sets j equal to k, and initializes bit-wise product BP to a zero vector of length N. At 310, peak detector 208 computes the $i^{th}$ value of the bit-wise product BP by multiplying the $i^{th}$ value of the sign signal SS and the $j^{th}$ value of the synchronization signal SM.

In an example, peak detector 208 computes a series of bit-wise products between the signs of the reference signal and the synchronization signal. To compute the bit-wise products, a sliding window of the reference signal signs is applied to the synchronization signal to generate a portion of the synchronization signal. A bit-wise product is evaluated between the sign signal and the portion of the synchronization signal. If the signs of all non-zero values of the bit-wise product are the same, peak detector 208 assigns a peak indicator signal a value of one at a location that matches a location along the synchronization signal. If the signs of the non-zero values of the bit-wise product are not the same, peak detector 208 assigns the peak indicator signal a value of zero at location that matches a location along the synchronization signal. The sliding window is shifted by a pre-determined number of spaces along the synchronization signal, and another bitwise product is evaluated. In some embodiments, the peak indicator signal is pre-computed. In particular, the peak indicator signal is a discrete time series of zeros and ones, and may remain fixed for a zone or region of a disk. In this case, the peak indicator signal may be determined only once for each zone or region.

At 312, peak detector 208 determines whether i has reached the length N of the sign signal SS. If i does not equal the length N, at 314, peak detector 208 increments each of i and j by 1, and process 300 returns to 310 to evaluate the next value of the bit-wise product BP. When i equals N (i.e., the length of the sign signal SS and the bit-wise product), peak detector 208 determines whether each non zero value in the bit-wise product BP has the same sign at 316. For example, a bit-wise product that indicates a positive or negative peak value may be [1 1 0 1 0], where all non-zero values have a positive sign. In another example, a bit-wise product indicating a positive or negative peak may be [0 −1 −1 0 −1], where all non-zero values have a negative sign. An example of a bit-wise product that indicates that no peak is present may be [1 −1 0 1 0], where all non-zero values do not have the same sign. If each non-zero value in the bit-wise product BP has the same sign, at 318, peak detector 208 assigns a value of 1 to the j-th value of the peak indicator signal PI, indicating that a peak in the synchronization signal SM has been detected at this location. Otherwise, if the non-zero values in the bit-wise product do not have the same sign, at 320, peak detector 208 assigns a value of zero to the j-th value of peak indicator signal PI, indicating that no peak in the filtered signal FS has been detected at this location.

At 322, peak detector 208 determines if j is equal to the length M of the synchronization signal SM. If j does not equal the length M, at 324, peak detector 208 increments k by Δk and process 300 returns to 308 to set j equal to k, re-initialize i to 1, and initialize the bit-wise product BP to a zero vector of length N. In some embodiments, Ak is 1, such that the sliding window is shifted by one bit to the right. In general, any suitable value for Δk may be used to increment k.

At 322, if j equals the length M, then process 300 proceeds to 326 where peak detector 208 determines positive peak values and negative peak values of the filtered signal FS from the peak indicator signal PI. Values of the peak indicator signal PI may be aligned with values of the filtered signal FS. In particular, when a value of the peak indicator signal PI is equal to 1, this indicates that a peak has been detected at a corresponding value of the filtered signal FS. Similarly, when a value of the peak indicator signal PI is equal to 0, this indicates that a peak is not present at a corresponding value of the filtered signal FS. To determine whether the peak is a positive or negative peak, peak detector 208 may evaluate the sign of the filtered signal FS. For example, when PI is 1 and the corresponding FS value is negative, then a negative peak is present. When PI is 1 and FS is positive, then a positive peak is present. Peak detector 208 may store each detected positive and negative peak in memory, such as buffer 203, so that the positive peak values may be used to evaluate the average A of the positive peaks and the negative peak values may be used to evaluate the average B of the negative peak values for Eqn. 2.

Figure 4:
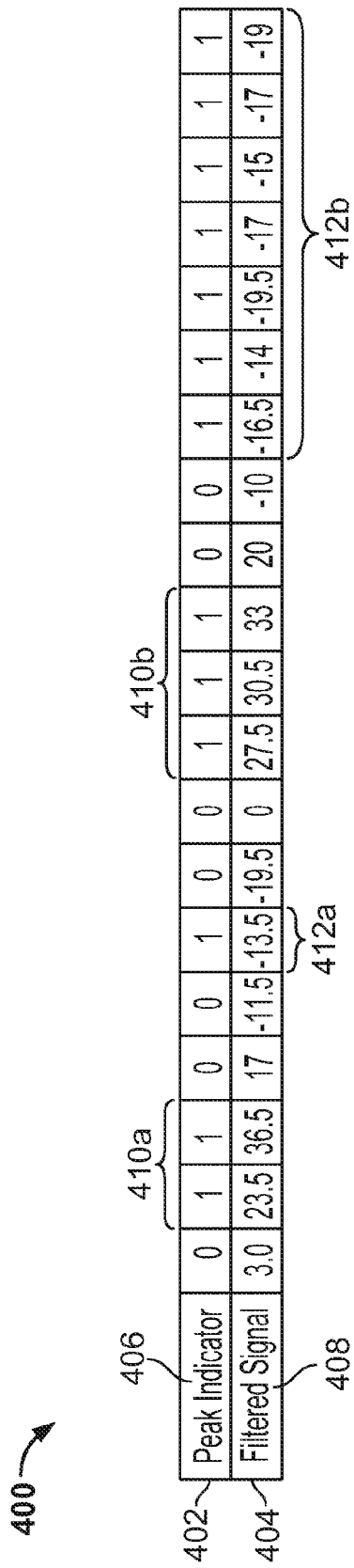
FIG. 4 shows an exemplary table of values for a peak indicator signal and a filtered synchronization signal in accordance with an embodiment of the present disclosure.

FIG. 4 shows an exemplary table 400 of values for a peak indicator signal and a filtered synchronization signal in accordance with an embodiment of the present disclosure. Table 400 includes row 402 containing values of peak indicator signal 406 and row 404 containing values of filtered synchronization signal 408. As described in relation to FIG. 3, peak detector 208 receives the filtered signal and performs computations on a reference signal, a synchronization signal, and the filtered signal to identify locations of peaks in the filtered signal to generate the peak indicator signal. As shown in FIG. 4, peak locations 410a and 410b correspond to positive peaks in the filtered signal, and peak locations 412a and 412b correspond to negative peaks in the filtered signal. Peak indicator signal 406 includes values of one at locations of positive or negative peaks in filtered synchronization signal 408, and values of zero where no peak is detected.

Figure 5:
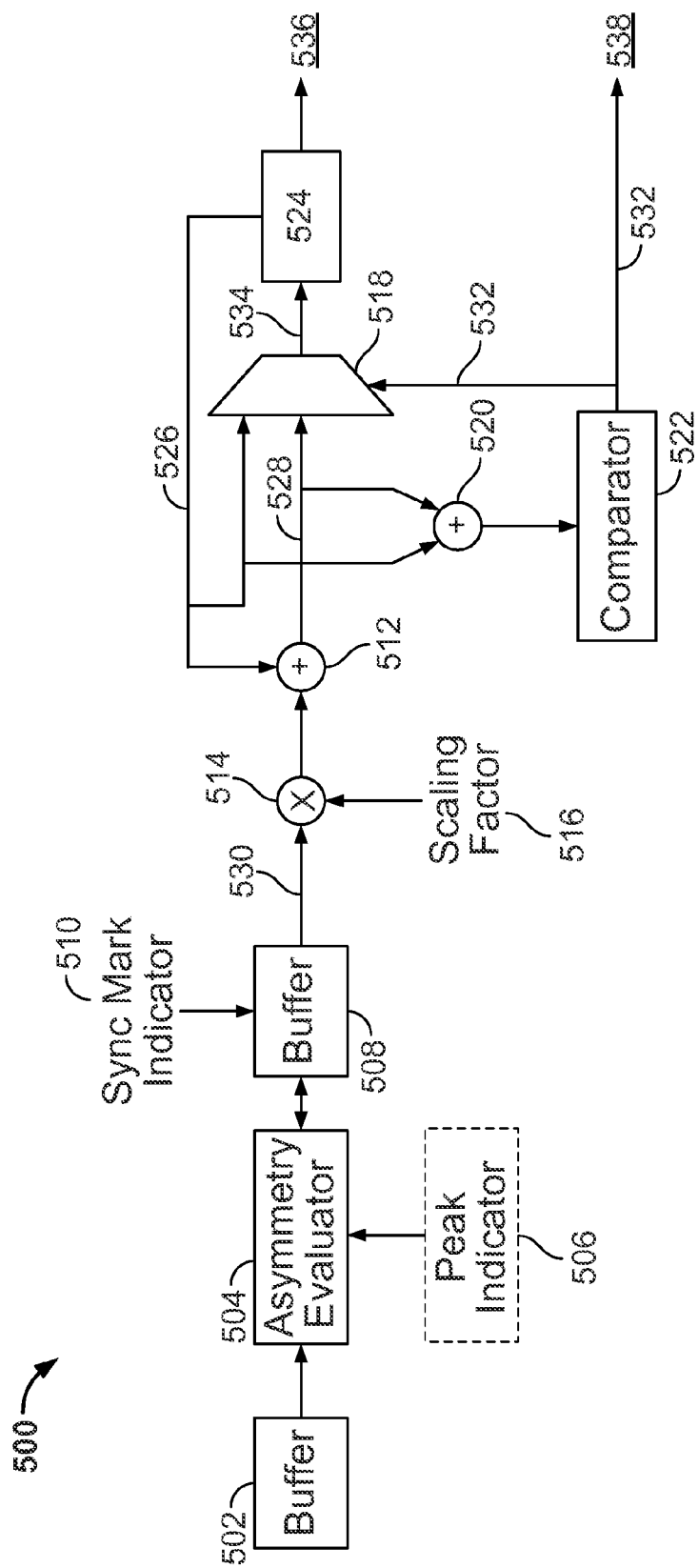
FIG. 5 shows an illustrative block diagram for a circuit that may evaluate asymmetry in a hard drive, in accordance with an embodiment of the present disclosure.

FIG. 5 shows an illustrative block diagram for a circuit 500 that evaluates asymmetry in a hard drive in accordance with an embodiment of the present disclosure. Circuit 500 includes buffer 502, asymmetry evaluator 504, peak indicator 506, buffer 508 that may receive a synchronization mark indicator 510, adder 512, multiplier 514, scaling factor 516, multiplexer 518, adder 520, comparator 522, and buffer 524.

Circuit 500 includes buffer 502 which buffers a filtered signal received from a read head of a hard drive. An asymmetry evaluator 504 receives the filtered signal from buffer 502 and a peak indicator signal from peak indicator 506. Asymmetry evaluator 504 evaluates the asymmetry of the received filtered signal as discussed in connection with asymmetry evaluator 200 in FIG. 2. Specifically, asymmetry evaluator 504 evaluates the asymmetry metric q for the received filtered signal. In some embodiments, asymmetry evaluator 504 may evaluate asymmetry of a received filtered signal continuously for a predetermined number of bits until a synchronization mark is found or the searching operation aborts. In this case, asymmetry evaluator 504 computes an asymmetry metric for a predefined number of bits in the filtered signal and stores the asymmetry metric q in buffer 508. The predefined number may correspond to a 20-bit correlation synchronization mark or a 36-bit Viterbi synchronization mark as discussed above, although any suitable number of bits may be used. Asymmetry evaluator 504 repeats this computation for the next set of bits and stores the new asymmetry metric q in buffer 508 until an asymmetry metric is computed for a synchronization mark.

In another embodiment, buffer 502 may continuously store the filtered signal until a synchronization mark is found or the searching operation aborts. Buffer 508 may receive synchronization mark indicator 510 to indicate where the synchronization mark is located in the filtered signal. Once the location of the synchronization mark is known, asymmetry evaluator may perform computation of the asymmetry metric q. In an example, synchronization mark indicator 510 provides an indication of the synchronization marks by providing a vector of bits, each bit indicating whether a synchronization mark is identified or not.

Multiplier 514 computes a multiplication between a current asymmetry metric 530 stored at buffer 508 with a scaling factor 516. Adder 512 computes a sum between the product and a previously evaluated asymmetry metric 526 stored at buffer 524. Previously evaluated asymmetry metric 526 may correspond to the asymmetry metric 526 computed at the previous iteration, or at an earlier iteration. The sum of the scaled current asymmetry metric 530 and previously evaluated asymmetry metric 526 is computed so that the previously applied asymmetry metric continues to be applied to the received signal (i.e., it is "remembered" by circuit 500). A scaling factor may be used if it is undesirable to fully correct the asymmetry, if the estimation of the asymmetry is inaccurate, if the asymmetry calculation is known to have a fixed error, or a combination thereof. In particular, in some embodiments, applying 100% compensation for the asymmetry results in a higher bit error rate than if less or more compensation is applied for the asymmetry. In some embodiments, the asymmetry model described herein is not accurate, such that the scaling factor is applied to achieve a better result than without the scaling factor. In this manner, the scaling factor defines a relationship between the measured asymmetry metric and the amount of correction to be applied to the asymmetry. Multiplexer 518 receives current evaluated asymmetry metric 528 in addition to previously evaluated asymmetry metric 526 and selects either the current evaluated asymmetry metric 528 or previously evaluated asymmetry metric 528 based on control signal 532.

Adder 520 computes a difference between current evaluated asymmetry metric 528 and previously evaluated asymmetry metric 526. This difference is calculated so that circuit 500 may determine if circuitry 500 should initialize an asymmetry correction circuit with a new asymmetry metric. For example, if the difference is small, the circuit may not initialize asymmetry correction circuitry with a new asymmetry metric. The difference is passed to comparator 522 which determines if the difference exceeds a predefined threshold. If the difference exceeds the threshold, comparator 522 passes a selection bit in the form of control signal 532 to multiplexer 518 to select current asymmetry metric 528. Alternatively, if the difference does not exceed the threshold, comparator 522 passes a selection bit in the form of control signal 532 to multiplexer 518 to select previously evaluated asymmetry metric 526. Multiplexer 518 then passes the selected asymmetry metric 534 to buffer 524, which stores the asymmetry metric and passes the stored asymmetry metric to asymmetry correction loop 536.

In general, circuit 500 evaluates an asymmetry metric, determines whether to use a current evaluated asymmetry metric or a previously evaluated asymmetry metric, and passes the asymmetry metric to an asymmetry correction loop that corrects asymmetry in a received signal. While circuit 500 is just one example of a circuit that may be used for evaluating an asymmetry metric, other circuits may be used to evaluate an asymmetry metric without departing from the scope of the present disclosure.

Figure 6:
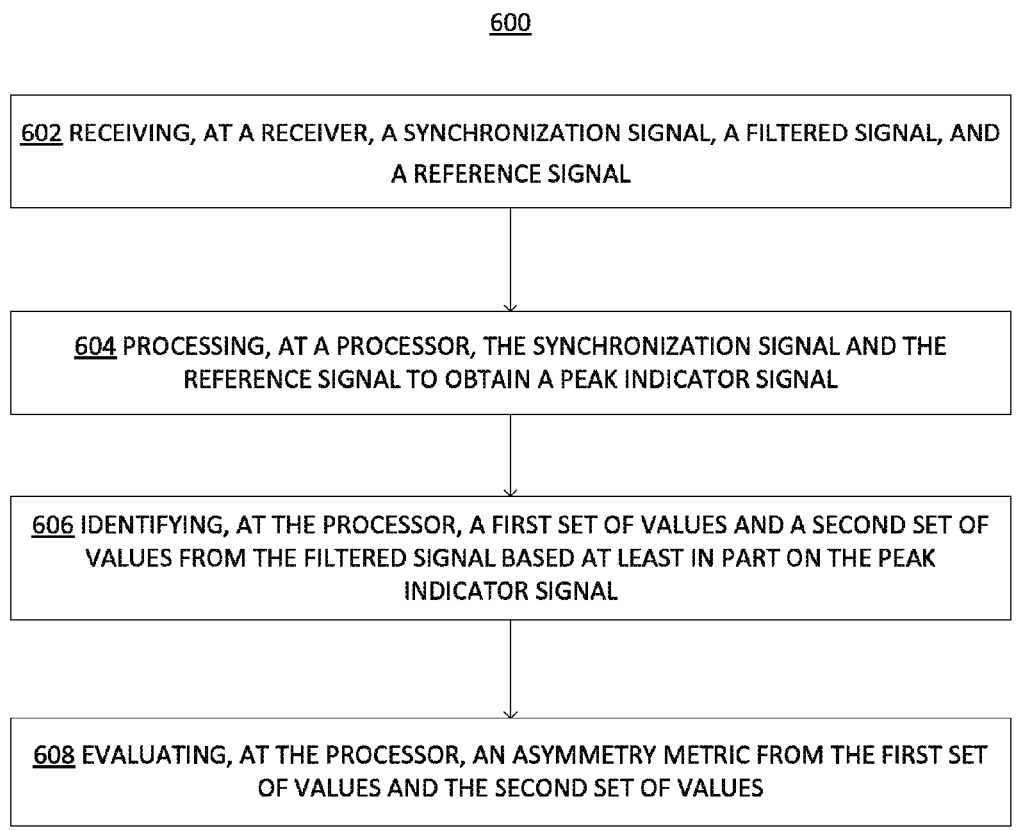
FIG. 6 shows a high level flow diagram of a process for evaluating asymmetry in a hard drive, in accordance with an embodiment of the present disclosure.

FIG. 6 shows a high level flow diagram of a process for evaluating asymmetry in a hard drive in accordance with an embodiment of the present disclosure. At 602, HDC 116 receives a synchronization signal, a filtered signal, and a reference signal. As stated above, the synchronization signal is a known pattern that identifies the start of user data in a hard disk. In one example, HDC 116 detects the synchronization signal in a received signal by detecting a pre-defined pattern. In particular, the pre-defined pattern may be a correlation synchronization mark that has a 20-bit user defined pattern. As another example, a Viterbi synchronization mark may be used which has a 36-bit fixed pattern. In general, any suitable signal that identifies the start of user data may be used. The filtered signal is a filtered version of the synchronization signal. As discussed above, the synchronization signal may be filtered by using a finite impulse response filter, Kalman filter, a filter based on a Fourier transform, or any other suitable type of filter. The reference signal is a known signal that is used to determine filter coefficients.

At 604, HDC 116 processes the synchronization signal and the reference signal to obtain a peak indicator signal. In one example, to obtain the peak indicator signal, HDC 116 evaluates the signs of the reference signal to obtain a sign signal. HDC 116 then evaluates bit-wise products between the sign signal and the synchronization signal by multiplying the synchronization signal with the sign signal. In particular, a sliding window of the sign signal may be applied to the synchronization signal to isolate a portion of the synchronization signal. A bit-wise product is evaluated between the sign signal and the isolated portion of the synchronization signal. If the signs of all non-zero values of the bit-wise product are the same, HDC 116 assigns a peak indicator signal a value of one at a location that matches a location along the synchronization signal. If the signs of the non-zero values of the bit-wise product are not the same, HDC assigns the peak indicator signal a value of zero at location that matches a location along the synchronization signal. The sliding window may be shifted by a pre-determined number of spaces along the synchronization signal, and another bitwise product may be evaluated.

At 606, HDC 116 identifies a first set of values and a second set of values from the filtered signal based at least in part on the peak indicator signal. In an example, the first set of values corresponds to positive peak values and the second set of values corresponds to negative peak values. To identify the first set of values and the second set of values, HDC 116 compares the peak indicator signal to the filtered synchronization signal. HDC 116 identifies the first set of values by identifying values of the filtered synchronization signal where the peak indicator signal equals 1 and the filtered synchronization signal is greater than zero. HDC 116 identifies the second set of values by identifying values of the filtered synchronization signal where the peak indicator signal is 1 and the value of the filtered synchronization signal is less than zero. After the set of positive peak values and the set of negative peak values are identified, HDC 116 may evaluate an average positive peak value A from the set of positive peak values and an average negative peak value B from the set of negative peak values.

At 608, HDC evaluates an asymmetry metric from the first set of values and the second set of values. In particular, the average positive peak value A and the average negative peak value B may be used to evaluate the asymmetry metric q in accordance with Eqn. 2. The asymmetry metric is a measure of asymmetry in a signal and my range from −1 to 1. If the asymmetry metric q is zero, then the signal is substantially symmetric. On the other hand, when asymmetry metric is not zero, asymmetry is present in the signal. In particular the higher the magnitude of the asymmetry metric, the more asymmetry is present in the signal.

Figure 7:
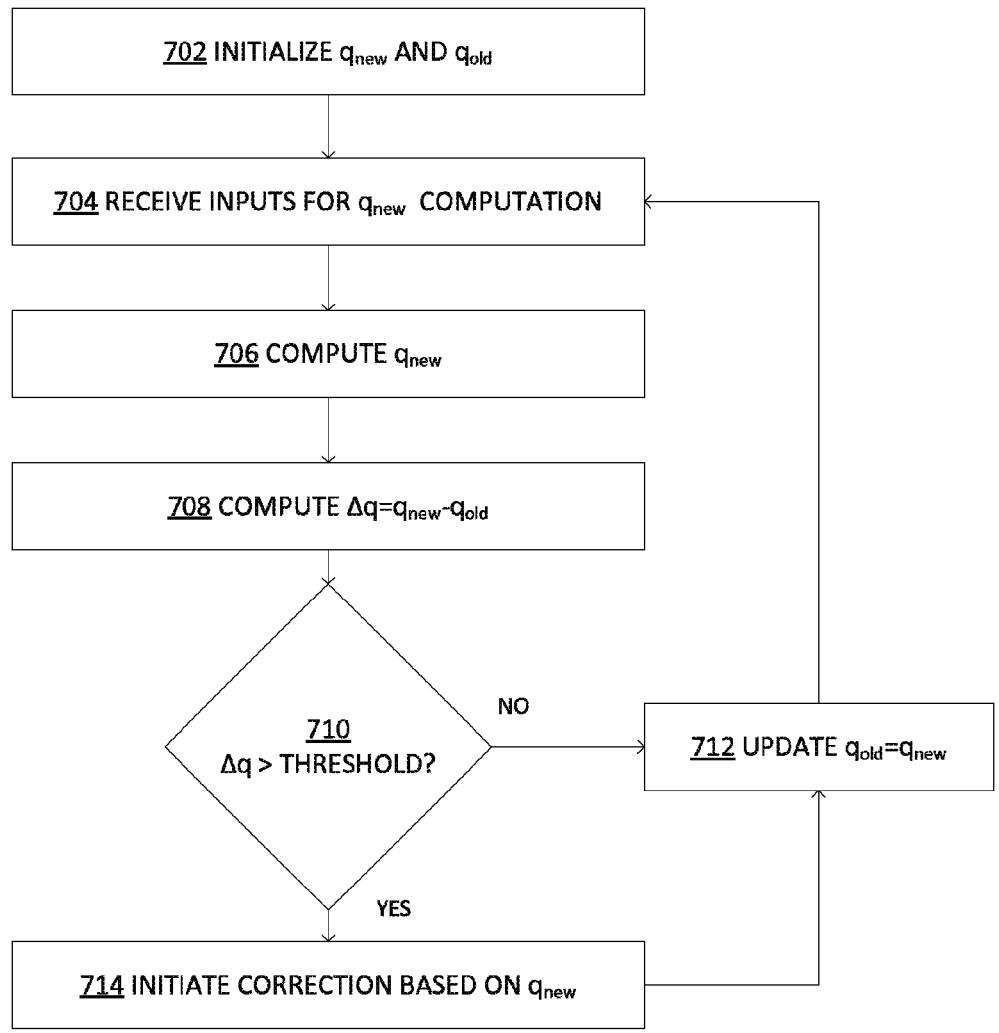
FIG. 7 shows a flow diagram for correcting asymmetry in a read channel of a hard drive, in accordance with an embodiment of the present disclosure.

FIG. 7 shows a flow diagram for correcting asymmetry in a read channel of a hard drive in accordance with an embodiment of the present disclosure. At 702, asymmetry evaluator 200 initializes variables for a new asymmetry metric $q_{new}$ and an old asymmetry metric $q_{old}$ to zero. At 704, asymmetry evaluator 200 receives inputs for computing an updated value for $q_{new}$. The inputs may include the average positive peak value A and the average negative peak value B. Average positive peak value A and average negative peak value B are computed from positive peak values and negative peak values that are detected in a filtered synchronization signal by a process such as that shown in FIG. 3.

At 706, asymmetry evaluator computes new asymmetry metric $q_{new}$, such as by using Eqn. 2. In particular, $q_{new}$ may be set to be equal to a difference in magnitudes between A and B, normalized by the sum of the magnitudes of A and B. Eqn. 2 describes only one example of how an asymmetry metric may be computed. In general, one of ordinary skill in the art will understand that any suitable measure of difference may be used, including another type of normalized difference, a raw difference, a percentage, or a fraction, without departing from the scope of the present disclosure.

At 708, asymmetry evaluator computes a change in asymmetry $\Delta q$ between the new asymmetry metric $q_{new}$ and the old asymmetry metric $q_{old}$. The change in asymmetry metric may be used to determine if a large enough change in asymmetry has occurred in the hard disk. If the change $\Delta q$ in asymmetry is greater than a predefined threshold, the asymmetry evaluator passes $q_{new}$ to an asymmetry correction circuit, such as ACC 128, to initiate the correction of asymmetry in the hard disk based on $q_{new}$.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for evaluating an asymmetry metric, the method comprising:
   receiving, at a receiver, a synchronization signal, a filtered signal, and a reference signal;
   processing, at a processor, the synchronization signal and the reference signal to obtain a peak indicator signal;
   identifying, at the processor, a first set of values and a second set of values from the filtered signal based at least in part on the peak indicator signal;
   evaluating, at the processor, an asymmetry metric from the first set of values and the second set of values; and
   using the asymmetry metric to initiate a correction in a read process for a hard drive.

2. The method of claim 1, wherein the synchronization signal is associated with the hard drive and the asymmetry metric is indicative of a degree of asymmetry in the hard drive.

3. The method of claim 1, wherein the filtered signal is representative of a finite impulse response of the synchronization signal.

4. The method of claim 1, wherein the first set of values corresponds to a set of positive peak locations in the filtered signal and the second set of values corresponds to a set of negative peak locations in the filtered signal.

5. The method of claim 1, wherein processing the synchronization signal and the reference signal to obtain the peak indicator signal comprises:
   evaluating the signs of the synchronization signal and the reference signal; and
   multiplying the signs of the synchronization signal with the signs of the reference signal.

6. The method of claim 1, wherein processing the synchronization signal and the reference signal to obtain the peak indicator signal comprises:
   applying a sliding window to the synchronization signal to generate portions of the synchronization signal; and
   evaluating a plurality of bit-wise products between the portions of the synchronization signal and the reference signal.

7. The method of claim 6, wherein each of the bit-wise products includes a plurality of values, the method further comprising assessing each bit-wise product to determine whether non-zero values in the corresponding plurality of values have a same sign.

8. The method of claim 1, wherein the asymmetry metric is a first asymmetry metric, the method further comprising:
   evaluating a second asymmetry metric;
   evaluating a difference between the first asymmetry metric and a second asymmetry metric; and
   correcting the synchronization signal for the asymmetry when the difference exceeds a symmetry threshold.

9. The method of claim 8, wherein correcting the synchronization signal comprises providing an estimate of asymmetry to initialize an asymmetry correction circuit.

10. A system for evaluating an asymmetry metric, the system comprising circuitry configured to:
    receive, at the circuitry, a synchronization signal, a filtered signal, and a reference signal;
    process, at the circuitry, the synchronization signal and the reference signal to obtain a peak indicator signal;
    identify, at the circuitry, a first set of values and a second set of values from the filtered signal based at least in part on the peak indicator signal;
    evaluate, at the circuitry, an asymmetry metric from the first set of values and the second set of values; and
    use the asymmetry metric to initiate a correction in a read process for a hard drive.

11. The system of claim 10, wherein the synchronization signal is associated with the hard drive and the asymmetry metric is indicative of a degree of asymmetry in the hard drive.

12. The system of claim 10, wherein the filtered signal is representative of a finite impulse response of the synchronization signal.

13. The system of claim 10, wherein the first set of values corresponds to a set of positive peak locations in the filtered signal and the second set of values corresponds to a set of negative peak locations in the filtered signal.

14. The system of claim 10, wherein the synchronization signal and the reference signal are processed to obtain the peak indicator signal by:
    evaluating the signs of the synchronization signal and the reference signal; and
    multiplying the signs of the synchronization signal with the signs of the reference signal.

15. The system of claim 10, wherein the synchronization signal and the reference signal are processed to obtain the peak indicator signal by:
    applying a sliding window to the synchronization signal to generate portions of the synchronization signal; and
    evaluating a plurality of bit-wise products between the portions of the synchronization signal and the reference signal.

16. The system of claim 15, wherein each of the bit-wise products includes a plurality of values, the circuitry further configured to assess each bit-wise product to determine whether non-zero values in the corresponding plurality of values have a same sign.

17. The system of claim 1, wherein the asymmetry metric is a first asymmetry metric, the circuitry further configured to:
    evaluate a second asymmetry metric;
    evaluate a difference between the first asymmetry metric and a second asymmetry metric; and
    correct the synchronization signal for the asymmetry when the difference exceeds a symmetry threshold.

18. The system of claim 17, wherein the synchronization signal is corrected by providing an estimate of asymmetry to initialize an asymmetry correction circuit.

* * * * *